United States Patent
Eidenschink et al.

(10) Patent No.: US 8,657,939 B2
(45) Date of Patent: Feb. 25, 2014

(54) AIR DRYER CARTRIDGE FOR A COMPRESSED AIR TREATMENT SYSTEM OF A VEHICLE

(75) Inventors: Rainer Eidenschink, Munich (DE); Stefan Schaebel, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/334,937

(22) Filed: Dec. 22, 2011

(65) Prior Publication Data

US 2012/0118157 A1    May 17, 2012

Related U.S. Application Data

(63) Continuation of application No. PCT/EP2010/058980, filed on Jun. 24, 2010.

(30) Foreign Application Priority Data

Jun. 29, 2009    (DE) .................. 10 2009 030 897

(51) Int. Cl.
    *B01D 53/02*    (2006.01)
(52) U.S. Cl.
    USPC .................. 96/134; 96/118; 96/131; 95/117; 55/318; 55/465; 55/DIG. 17
(58) Field of Classification Search
    USPC ....... 96/118, 131, 134; 55/318, 465, DIG. 17; 95/117
    See application file for complete search history.

(56) References Cited

U.S. PATENT DOCUMENTS

| 4,838,901 A | 6/1989 | Schmidt et al. |
| 5,711,550 A | 1/1998 | Brandt |
| 6,558,457 B1 * | 5/2003 | Kolczyk .................. 96/134 |

FOREIGN PATENT DOCUMENTS

| DE | 198 27 566 A1 | 1/1999 |
| DE | 199 55 898 A1 | 5/2001 |
| EP | 0 230 991 A1 | 8/1987 |
| EP | 0 733 844 A2 | 9/1996 |
| EP | 1 878 962 A1 | 1/2008 |
| EP | 2 140 924 A2 | 1/2010 |
| EP | 1 641 552 B1 | 10/2011 |

OTHER PUBLICATIONS

German Office Actiont dated Mar. 2, 2010 including English-language translation (Six (6) pages).
International Search Report dated Sep. 23, 2010 including English-language translation (Four (4) pages).
German Office Action dated Jun. 5, 2012 with English translation (twelve (12) pages).
International Preliminary Report on Patentability dated Jan. 26, 2012 (Nine (9) pages).

* cited by examiner

*Primary Examiner* — Christopher P Jones
(74) *Attorney, Agent, or Firm* — Crowell & Moring LLP

(57) ABSTRACT

An air dryer cartridge for a compressed air treatment system of a vehicle, in particular for a commercial vehicle, has a spring cover and a support element, which together define a volume of the air dryer cartridge in the assembled state of the air dryer cartridge. A desiccant box arranged inside the volume and filled with a desiccant is provided. The spring cover and the carrier element can be coupled via a snap connection.

18 Claims, 3 Drawing Sheets

US 8,657,939 B2

AIR DRYER CARTRIDGE FOR A COMPRESSED AIR TREATMENT SYSTEM OF A VEHICLE

CROSS-REFERENCE TO RELATED APPLICATIONS

This application is a continuation of PCT International Application No. PCT/EP2010/058980, filed Jun. 24, 2010, which claims priority under 35 U.S.C. §119 from German Patent Application No. DE 10 2009 030 897.0, filed Jun. 29, 2009, the entire disclosures of which are herein expressly incorporated by reference.

BACKGROUND AND SUMMARY OF THE INVENTION

The invention relates to an air dryer cartridge for a compressed air treatment system of a vehicle, in particular of a commercial vehicle, having a spring cover and a support element which together, in the assembled state of the air dryer cartridge, define a volume of the air dryer cartridge. A drying agent (desiccant) box is provided, which is arranged within the volume and which is filled with a drying agent. The spring cover and the support element are designed as cylinders substantially closed off on one side, at the open ends of which the spring cover and the support element can be coupled.

The invention also relates to a method for producing an air dryer cartridge for a compressed air treatment system of a vehicle, in particular of a commercial vehicle, wherein the air dryer cartridge includes a spring cover and a support element which together, in the assembled state of the air dryer cartridge, define a volume of the air dryer cartridge, and wherein a drying agent box which is filled with a drying agent is arranged within the volume.

The invention still further relates to a compressed air treatment system for a vehicle, in particular a commercial vehicle, having an air dryer cartridge according to the invention.

Air dryer cartridges are required within the context of the provision and treatment of compressed air for compressed air treatment systems, EAC for short, in particular in the commercial vehicle field. There, the air dryer cartridges are used for removing oil and dirt particles from the generated compressed air, and for drying the compressed air. Such air dryer cartridges are considered "wear parts" since they must be occasionally replaced.

An air dryer cartridge known from the prior art is illustrated in FIG. 1. The air dryer cartridge 10 shown is composed substantially of a drying agent box (also called a "desiccant box") 20, which is filled with a drying agent (also called a "desiccant") 38 and which is arranged in a spring cover 16. The spring cover 16 is closed off in the lower region by a base plate 42 with an air inlet 50 and an air outlet 52. The base plate 42 and the spring cover 16 are fixedly connected to one another by way of a flanged seam 56. An O-ring 44 and a sealing ring 40 with a rubber lip 48 provide sealing between the base plate 42 and the drying agent box 20, wherein the rubber lip 48 operates as a check valve.

The sealing ring 40 is mechanically or chemically connected to the drying agent box 20, wherein the rubber lip 48 has a defined opening and closing characteristic. In particular, the rubber lip 48 opens in the event of an excess pressure in the air dryer cartridge 10, and thus acts as a safety valve. The drying agent box 20 is delimited in its axial direction of extent by a first air filter 30 and a second air filter 32, which retain the drying agent 38 in the interior of the drying agent box 20.

Furthermore, in the upper region of the air dryer cartridge 10, there is arranged a compression spring 34 and a granulate cover 36, by which the drying agent 38 in the interior of the drying agent box 20 is compressed. The granulate cover 36 is, in particular, designed to be air permeable.

A combination filter, for example in the form of a coalescence filter 26, extends in the axial direction around the lower half of the drying agent box 20 and is fixed in the radial direction to a supporting structure 54 of the drying agent box 20 by a sleeve 28. The coalescence filter 26 divides the air dryer cartridge 10 into a pre-filter region and a post-filter region. It is the object of the coalescence filter 26 during a compressed air delivery phase to retain oil and dirt particles and also emulsion droplets on an incident-flow surface, to store liquid oil, and by means of a coalescence effect to convert extremely fine oil droplets and aerosols into liquid oil and separate out said oil. Here, the design of the outflow surface and the filter construction yield a defined ratio of air outflow speed and oil droplet size. This ratio ensures that no oil droplets pass via the post-filter region into the drying agent box 20 and thus shorten the service life of the air dryer cartridge 10 and downstream consumers.

Air guiding elements 46 project in the radial direction from the drying agent box 20 into the coalescence filter 26 and prevent the inflowing air from bypassing the coalescence filter 26. The sealing between the pre-filter region and the post-filter region during a compressed air delivery phase is thus realized by way of a special sealing geometry composed of air guiding elements 46 in conjunction with the sleeve 28 at the outside.

The coalescence filter 26 is wound in the azimuthal direction around the drying agent box 20, in particular on the supporting structure 54 which is permeable to air and which is part of the drying agent box 20. Here, the filter material of the coalescence filter 26 forms at least one filter layer in the radial direction. The sleeve 28, which may be formed for example as an elastic rubber sleeve, fixes the filter material of the coalescence filter 26 in the radial direction. At the same time, the sleeve 28 allows the coalescence filter 26 to breathe during the accumulation of oil and dirt particles within the filter material, and protects the coalescence filter 26 against destruction. The filter material of the coalescence filter 26 directly adjoins the drying agent box 20.

Furthermore, EP 0 230 991 A2 discloses an air dryer cartridge in which the housing parts of the air dryer cartridge are connected to one another by means of a snap-action connection which comprises a circlip.

Furthermore, U.S. Pat. No. 4,838,901 A and DE 198 27 566 A1 each disclose an air filter, the housings of which are, respectively, closed off by at least one flexible pair of "shoulders and posts" and joined together by means of a snap-action connection.

It is an object of the present invention to simplify the construction of an air dryer cartridge.

This and other objects are achieved by an air dryer cartridge for a compressed air treatment system of a vehicle, in particular of a commercial vehicle, having a spring cover and a support element which together, in the assembled state of the air dryer cartridge, define a volume of the air dryer cartridge. A drying agent box is provided which is arranged within the volume and which is filled with a drying agent. The spring cover and the support element are designed as cylinders substantially closed off on one side, at the open ends of which are arranged a snap-action connection by which the spring cover and the support element can be coupled. The snap-action connection element on the spring is encompassed on both sides perpendicular to an axial direction by the snap-action connection element on the support element.

As a result of the encompassment at both sides, the snap-action connection provides an adequate sealing action, such that an additional seal between the spring cover and the support element for sealing off the housing of the air dryer cartridge can be dispensed with. All the parts of the air dryer cartridge, in particular the necessary parts, are clamped between the spring cover and the support element. The parts of the air dryer cartridge include, for example, a granulate cover, a compression spring, a drying agent box, an air filter in the form of a nonwoven filter, drying agent, a check valve and a small O-ring. The compact cartridge unit can be easily removed from the compressed air treatment system, and exchanged, as a unit. The releasable snap-action connection allows the spring cover, the support element and further parts of the air dryer cartridge to be re-used, while worn parts, in particular the drying agent and filter nonwovens, can be exchanged.

It may preferably be provided that a coalescence filter is wound on the drying agent box and is fixed by a sleeve. The winding of the coalescence filter on the drying agent box makes it possible to dispense with a support device, which is separate from the drying agent box and which positions the coalescence filter within the air dryer cartridge at the side remote from the drying agent box.

It is particularly preferable for air filters to be arranged on an upper end and on a lower end of the drying agent box. The drying agent present in the interior of the drying agent box can be prevented from exiting the drying agent box by means of the air filters.

It may be provided that a granulate cover which is braced with respect to the spring cover by a compression spring fixes the drying agent in the drying agent box. In this way, the drying agent, which is usually present as granulate in the drying agent box, can be kept as densely packed as possible, wherein drying agent losses which occur through natural wear can be compensated by a reduction in size of the provided volume, in order to maintain the dense packing.

It may also be provided that the support element and the drying agent box are produced in one piece. This permits a "direct" coupling of the spring cover to the drying agent box without further components, such that the construction of the air dryer cartridge as a whole is simplified.

In the described method, it may be provided that the spring cover and the support element are coupled by a snap-action connection.

This also applies to the particularly preferred embodiments of the described method.

The method may in particular be refined in that a coalescence filter is wound on the drying agent box and fixed by a sleeve.

It may advantageously be provided that, before the filling of the drying agent box with drying agent, a first air filter is arranged at a lower end of the drying agent box, and that after the filling of the drying agent box with drying agent, a second air filter is arranged at the top end of the drying agent box.

It may also be provided that the drying agent is fixed in the drying agent box by a granulate cover, which is braced with respect to the spring cover by a compression spring.

It may also be provided that the support element and the drying agent box are produced in one piece.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
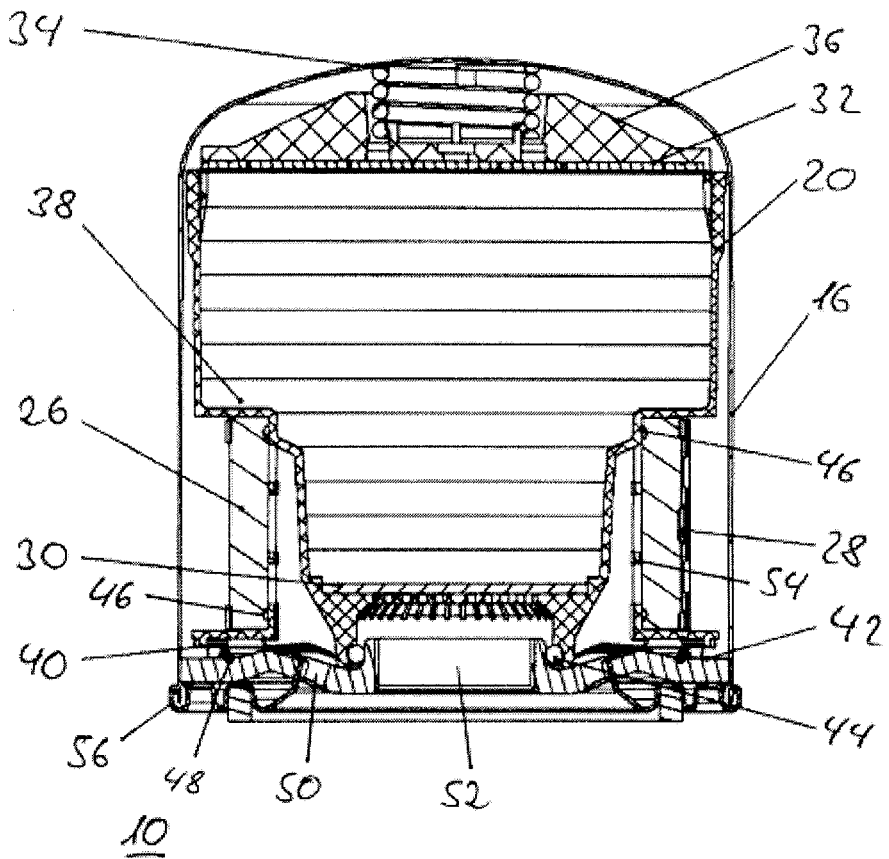
FIG. 1 shows an air dryer cartridge according to the prior art.

In the following drawings, the same reference numerals are used to denote identical or similar parts.

FIG. 1 shows an air dryer cartridge 10 according to the prior art, the construction of which has already been described.

Figure 2:
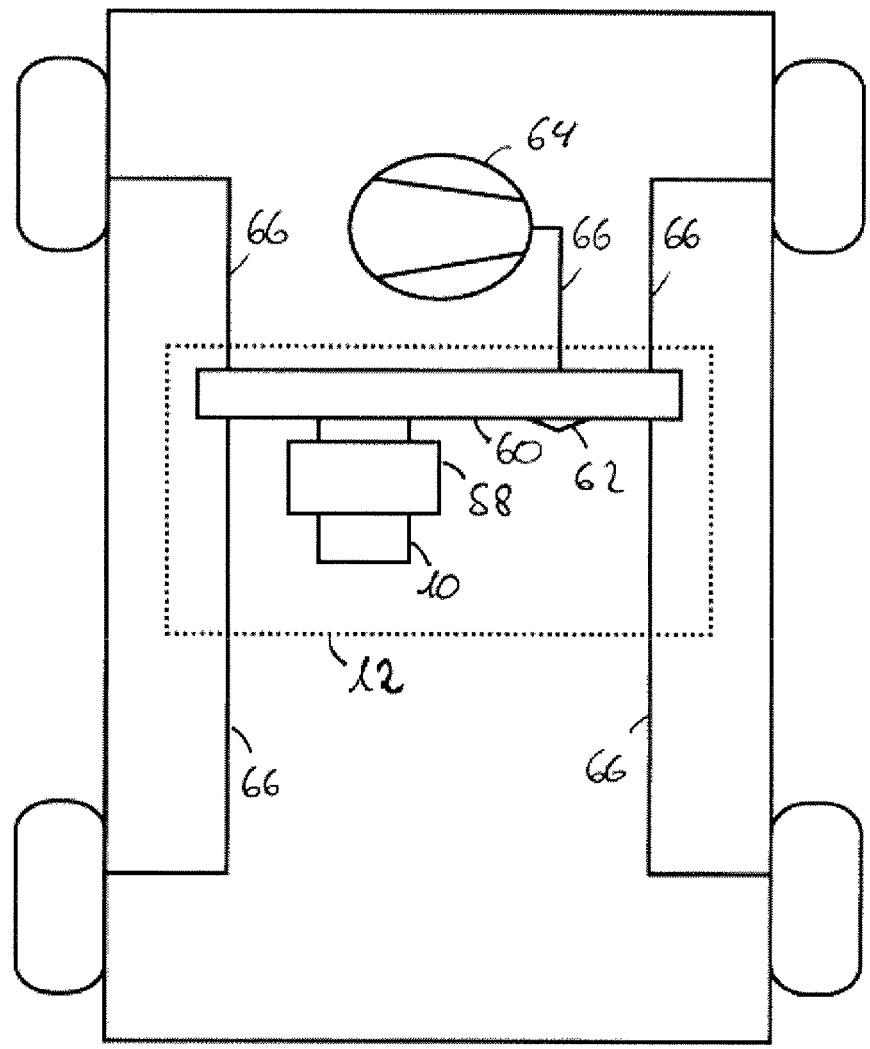
FIG. 2 is a schematic illustration of a vehicle having a compressed air treatment system which includes an air dryer with an air dryer cartridge.

FIG. 2 is a schematic illustration of a vehicle 14 having an air treatment system 12, which includes an air dryer 58 with an air dryer cartridge 10. The compressed air treatment system 12 receives compressed air from a compressor 64, and distributes the treated compressed air to individual consumers via compressed air lines 66. For this purpose, a valve device 60 comprising numerous valves and having a vent 62 is provided, which valve device 60 can be actuated by a control unit (not illustrated). The valve device 60 may, for example, include a pressure regulator and a multi-circuit protection valve. Illustrated in schematically simplified form in FIG. 2 as consumers are brake cylinders of a compressed-air-operated brake system, without the necessary actuation means being indicated.

Figure 3:
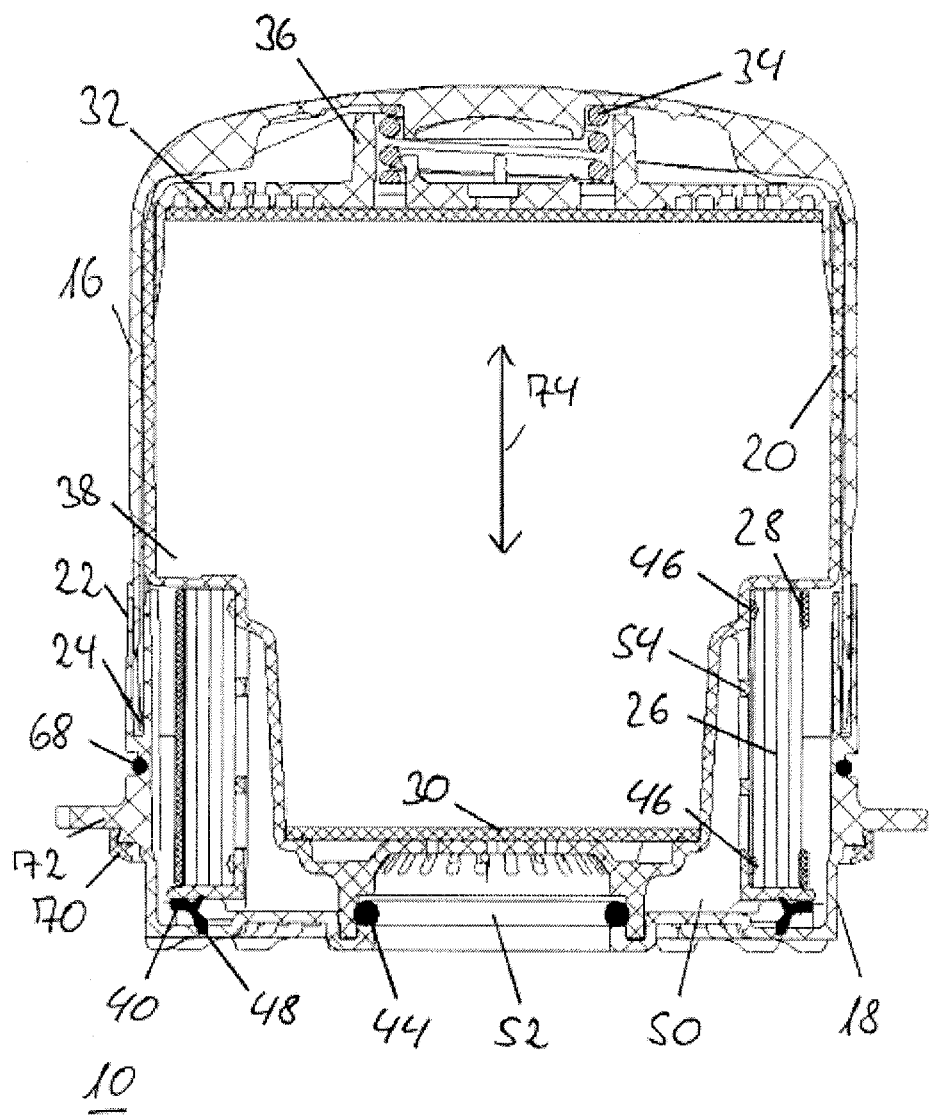
FIG. 3 is a sectional illustration of an air dryer cartridge according to an embodiment of the invention.

FIG. 3 is a cross-sectional illustration of an air dryer cartridge according to an embodiment of the invention. The mode of operation of the air dryer cartridge 10 illustrated in FIG. 3 corresponds to that of the air dryer cartridge 10 known from FIG. 1. In the illustrated embodiment, the base plate 42, which is fixedly connected by a flanged seam 56 to the spring cover 16 in FIG. 1, is replaced by a support element 18, which is coupled by snap-action connectors 22, 24 to the spring cover 16. The snap-action connectors 22, 24 form a positively locking connection between the spring cover 16 and the support element 18, wherein the individual elements of the snap-action connectors 22, 24 may be formed as hooks, studs or beads on the spring cover 16 and/or on the support element 18 and, after assembly, latch into corresponding depressions or cutouts on the other part 18, 16 in each case.

Here, the spring cover 16 and the support element 18 constitute joining partners, which are to be coupled by the snap-action connectors 22, 24 and which, during the assembly of the air dryer cartridge 10, are pushed into or onto one another in an axial direction 74 until the latching of the snap-action connectors 22, 24 takes place, wherein the hooks, studs or beads which are guided past the associated depressions or recesses by way of elastic deformation of one or both joining partners and/or the hooks, studs and beads themselves.

Here, the spring cover 16 and support element 18 are clipped together by the snap-action connectors 22, 24. On the support element 18 there is arranged a projection 72 surrounded by a first seal 68, which provides sealing between the support element 18 and the cartridge housing (not illustrated), and a second seal 70, which provides sealing between the support element 18 and a housing (not illustrated) of the compressed air treatment system (EAC).

The arrangement may be provided, for example, for the mounting of the air dryer cartridge 10 on the compressed air treatment system 12 by way of a bayonet ring connection (not illustrated). The two seals 68, 70 therefore constitute seals which seal off the interior of the compressed air supply system, which during operation is generally at an elevated pressure in relation to the environment, from the environment. The spring cover 16 and the support element 18 may be formed in particular by cylindrical structures which are substantially open on one side, wherein the air inlet 50 and the air outlet 52 are provided in the support element 18.

It is, however, also contemplated in a way which is not illustrated, for the support element 18 to take more the form of a circular ring, by which the drying agent box 20 is pressed against the spring cover 16. In this case, the air inlet 50 and the air outlet 52 may be formed directly by the drying agent box 20.

It is likewise possible for the support element 18 to be formed in one piece with the drying agent box 20. In this case, the spring cover 16 would be coupled "directly" to the drying agent box 20, because a separate support element 18 would be dispensed with, or would be regarded as a constituent part of the drying agent box 20. The diameter of the spring cover 16 perpendicular to the axial direction 74 may be greater than or smaller than the diameter of the support element 18, or may be selected to allow the spring cover 16 and support element 18 to be at least partially pushed one into the other until the "latching", that is to say closure, of the snap-action connectors 22, 24 occurs. It is also contemplated for the diameter of the spring cover 16 to correspond to that of the support element 18, wherein then, during the joining process, the snap-action connectors 22, 24 on those edges of the cylinder walls which come into contact with one another engage one into the other in order to produce the connection. The structural height of the support element 18 in the axial direction 74 may be varied in a simple manner.

The production of the air dryer cartridge 10 according to the invention will be briefly described below.

The coalescence filter 26 is wound on the drying agent box 20 and fixed by way of the sleeve 28. The O-ring 44 is mounted on the base side of the drying agent box 20. The first air filter 30 is subsequently placed into the open drying agent box 20 from above, and the drying agent box is filled with granular drying agent 38. The second air filter 32 is placed onto the drying agent 38 from above, and is covered on its top side by the granulate cover 36 in order that the drying agent 38 cannot trickle out of the drying agent box 20. To prevent relative movements within the drying agent 38, the granulate cover 36 is braced with respect to the spring cover 16 (to be placed on), and in the process is pressed into the drying agent 38, by way of the pressure spring 34. This prevents mechanical disintegration of the granulate as a result of vibrations, and at the same time permits automatic fixing of the drying agent 38, by the lowering of the granulate cover 36, as the "fill level" within the drying box 20 falls as a result of wear. The support element 18 is subsequently equipped with the sealing ring 40, the first seal 68 and the second seal 70. The filled, preassembled container unit composed of the spring cover 16 and the filled drying agent box 20 is inserted into the support element 18 equipped with the seals 68, 70 and the sealing ring 40, and the drying agent box 20 is braced between the spring cover 16 and the support element 18 by the snap-action connectors 22, 24. It is alternatively also contemplated for the sealing ring 40 to be fastened to the drying agent box 20. The functionality of the sealing lip 48 as a safety valve is important in both possible arrangements. The safety valve opens when an excess pressure prevails in the air dryer cartridge 10. In this way, it is also possible for deposited oil and dirt particles to be flushed out, bypassing the coalescence filter 26, during a regeneration phase of the air dryer cartridge 10.

By way of the snap-action connectors 22, 24, the air dryer cartridge 10 can be temporarily stored or transported within the assembly facility without the entire unit falling apart, and without drying agent 38 trickling out. By means of corresponding outer packaging (not illustrated), it is also possible for this unit to be placed in storage and used for easy exchange of the filter cartridge during servicing. Here, the outer packaging serves substantially to protect the drying agent 38 against moisture.

A particular advantage of the construction according to the invention is that assembly can be realized by simply placing the spring cover 16 and support element 18 together, wherein no additional working steps or tools are required. Depending on requirements, the provision of the coalescence filter 26 in the air dryer cartridge 10 may be dispensed with.

LIST OF REFERENCE NUMERALS

10 Air dryer cartridge
12 Compressed air treatment system
14 Vehicle
16 Spring cover
18 Support element
20 Drying agent box
22 Snap-action connection
24 Snap-action connection
26 Coalescence filter
28 Sleeve
30 First air filter
32 Second air filter
34 Compression spring
36 Granulate cover
38 Drying agent
40 Sealing ring
42 Base plate
44 O-ring
46 Air guiding element
48 Rubber lip
50 Air inlet
52 Air outlet
54 Supporting structure
56 Flanged seam
58 Air dryer
60 Valve device
62 Vent
64 Compressor
66 Compressed air line
68 First seal
70 Second seal
72 Projection
74 Axial direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air dryer cartridge for a compressed air treatment system of a vehicle, comprising:
   a spring cover having a cylindrical shape, the cylindrical shape being substantially closed off on one end side and open at another end side;

a support element having a cylindrical shape, the cylindrical shape being substantially closed off on one end side and open at another end side;

a drying agent box filled with a drying agent, the drying agent box being arranged within an interior volume defined by an assembled state of the spring cover coupled to the support element; and a snap-action connection arranged at the open end sides of the spring cover and the support element, a portion of the snap-action connection on the spring cover being encompassed at both sides, perpendicular to an axial direction of the air dryer cartridge, by a further portion of the snap-action connection on the support element.

2. The air dryer cartridge according to claim 1, further comprising:

a coalescence filter wound around the drying agent box; and a sleeve fixing the coalescence filter on the drying agent box.

3. The air dryer cartridge according to claim 2, further comprising first and second air filters, the first air filter being arranged on an upper end of the drying agent box and the second air filter being arranged on a lower end of the drying agent box.

4. The air dryer cartridge according to claim 2, further comprising a granulate cover arranged at an upper end of the drying agent box, the granulate cover being pressed against the drying agent via a compression spring bracing the granulate cover against the spring cover.

5. The air dryer cartridge according to claim 2, wherein, in use, the further portion of the snap-action connection overlaps an entirety of the sleeve.

6. The air dryer cartridge according to claim 1, further comprising first and second air filters, the first air filter being arranged on an upper end of the drying agent box and the second air filter being arranged on a lower end of the drying agent box.

7. The air dryer cartridge according to claim 6, further comprising a granulate cover arranged at an upper end of the drying agent box, the granulate cover being pressed against the drying agent via a compression spring bracing the granulate cover against the spring cover.

8. The air dryer cartridge according to claim 6, wherein the second air filter is: i) closer to the lower end of the drying agent box than to a projection of the support element, and ii) substantially parallel to the projection of the support element.

9. The air dryer cartridge according to claim 1, further comprising a granulate cover arranged at an upper end of the drying agent box, the granulate cover being pressed against the drying agent via a compression spring bracing the granulate cover against the spring cover.

10. The air dryer cartridge according to claim 9, wherein when the granulate cover is viewed in cross-section, the granulate cover has an L-shape, an inner surface of the spring cover has a substantially concave shape, and the compression spring braces the granulate cover against the substantially concave shape of the inner surface of the spring cover.

11. The air dryer cartridge according to claim 1, wherein the support element and the drying agent box are formed in one-piece.

12. The air dryer cartridge according to claim 1, wherein the air dryer cartridge is a commercial vehicle air dryer cartridge for the compressed air treatment system.

13. The air dryer cartridge according to claim 1, wherein the further portion of the snap-action connection extends along the axial direction to a point where an inner diameter of the drying agent box changes from a first diameter to a second diameter that is substantially larger than the first diameter.

14. The air dryer cartridge according to claim 1, wherein a position of an end of the further portion of the snap-action connection along the axial direction corresponds to a position of an end of the coalescence filter that is closest to the closed end of the spring cover.

15. A compressed air treatment system for a vehicle, comprising:

an air dryer cartridge comprising:

a spring cover having a cylindrical shape, the cylindrical shape being substantially closed off on one end side and open at another end side;

a support element having a cylindrical shape, the cylindrical shape being substantially closed off on one end side and open at another end side;

a drying agent box filled with a drying agent, the drying agent box being arranged within an interior volume defined by an assembled state of the spring cover coupled to the support element; and a snap-action connection arranged at the open end sides of the spring cover and the support element, a portion of the snap-action connection on the spring cover being encompassed at both sides, perpendicular to an axial direction of the air dryer cartridge, by a further portion of the snap-action connection on the support element.

16. The compressed air treatment system according to claim 15, wherein the compressed air treatment system is a commercial vehicle compressed air treatment system.

17. The compressed air treatment system according to claim 15, wherein the further portion of the snap-action connection extends along the axial direction to a point where an inner diameter of the drying agent box changes from a first diameter to a second diameter that is substantially larger than the first diameter.

18. The compressed air treatment system according to claim 15, wherein a position of an end of the further portion of the snap-action connection along the axial direction corresponds to a position of an end of the coalescence filter that is closest to the closed end of the spring cover.

* * * * *